United States Patent
Brassert et al.

[11] Patent Number: 5,345,827
[45] Date of Patent: Sep. 13, 1994

[54] ABSORPTION DYNAMOMETER AND TORQUE MEASUREMENT THEREFOR

[75] Inventors: Walter L. Brassert, Belmont; Paul N. Dahlstrand, Andover, both of Mass.

[73] Assignee: Northern Research & Engineering Corporation, Woburn, Mass.

[21] Appl. No.: 92,094

[22] Filed: Jul. 15, 1993

[51] Int. Cl.⁵ .............................................. G01L 3/20
[52] U.S. Cl. ............................. 73/862.15; 73/862.09
[58] Field of Search ............ 73/862.09, 862.10, 862.11, 73/862.12, 862.13, 862.14, 862.15, 862.16, 862.17, 862.18

[56] References Cited

U.S. PATENT DOCUMENTS

| | | | |
|---|---|---|---|
| 3,548,649 | 12/1970 | Parkinson | 73/136 |
| 3,572,106 | 3/1971 | Jonas | 73/136 |
| 3,796,093 | 3/1974 | Parkinson | 73/136 A |
| 4,450,729 | 5/1984 | Troeder et al. | 73/862.34 |
| 4,488,443 | 12/1984 | Parkinson | 73/862.33 |
| 4,590,806 | 5/1986 | Lutton et al. | 73/862.34 |
| 4,682,505 | 7/1987 | Morissette et al. | 73/862.34 |
| 4,744,724 | 5/1988 | Brassert et al. | 415/158 |
| 4,899,596 | 2/1990 | Janik et al. | 73/862.33 |
| 4,947,035 | 8/1990 | Zook et al. | 250/225 |
| 5,228,349 | 7/1993 | Gee et al. | 73/862.336 |

FOREIGN PATENT DOCUMENTS

484421 9/1975 U.S.S.R. .

Primary Examiner—Richard E. Chilcot, Jr.
Assistant Examiner—R. Biegel
Attorney, Agent, or Firm—Michael H. Minns

[57] ABSTRACT

The invention is an in-line torque meter for use with an absorption dynamometer in which the twist of a rotating shaft that transmits torque from an engine to an air dynamometer is measured by a single sensor on the adjacent stationary structure. The torque shaft is supported at the dynamometer end by a splined attachment to the shaft of the dynamometer and at the engine end in a pair of preloaded angular contact ball bearings. Torque from the engine causes the shaft to twist. Attached to and rotating with the shaft are two sleeves with projecting teeth, one sleeve attached at each end of the torque shaft. The projecting teeth are interleaved and are located so that both sets of teeth can be sensed by an adjacent single sensor. When the shaft is twisted by the applied torque, the teeth on the two sleeves are angularly displaced with respect to each other. This angular displacement is measured as a phase shift in the signal generated by the sensor. The phase shift being directly proportional to the applied torque.

23 Claims, 3 Drawing Sheets

ABSORPTION DYNAMOMETER AND TORQUE MEASUREMENT THEREFOR

BACKGROUND OF THE INVENTION

This invention pertains to absorption dynamometers, and in particular, to torque measuring devices used in combination with air absorption dynamometers.

Means of measuring torque generally fall into two categories: in-line (rotating) and reaction (stationary). Reaction torque measurements are used with air dynamometers, but they are inaccurate, being subject to errors introduced by aerodynamic effects associated with the exhaust of the engine being tested, the exhaust of the dynamometer, and local external air velocities. In-line torque measurements have also been used, but prior in-line torque meters have various drawbacks.

In one type of in-line torque meter, strain gages are applied to a rotating member through which the torque is transmitted. The strain gages sense the twist of this member by minute changes in resistance which are measured as changes in voltage in a bridge circuit. Because of the high rotating speed in the dynamometer, communicating the strain gage signal from the rotor to the stator is difficult and the available mechanisms available (slip rings, telemetry) are sources of unreliability and error.

In another type of in-line torque meter, two concentric shafts are located between the engine and the dynamometer. The inner shaft is connected to both the engine and the dynamometer. It transmits the torque and in so doing is twisted in proportion to the torque. The outer shaft is connected at only one end and transmits no torque. The angular displacement between these concentric shafts is a measure of the applied torque. This angular displacement is measured by comparing the phase of two sensors located on adjacent stationary structure. One of the sensors observes the passing of teeth on the inner shaft, the other the teeth on the outer shaft. As these teeth are angularly displaced relative to each other in proportion to the applied torque, the phase relationship of the signals from the two sensors is also displaced in proportion to the torque.

This type of in-line torque meter suffers from two drawbacks. The use of two sensors introduces an inherent error into the measurement. As the quantity being measured is the difference between the signals from the two sensors, any errors due to drift in the sensors themselves are combined into the measurement error.

The foregoing illustrates limitations known to exist in present dynamometer torque measurement systems. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an absorption dynamometer; and an in-line torque meter having a rotating torsion shaft, one end of the shaft being coupled to the dynamometer, a support means for rotatably supporting the shaft being coupled to the other end of the shaft, the support means being mounted in a housing, the housing axially extending from the dynamometer, at least one first tooth projecting from a first location on the torsion shaft, at least one second tooth projecting from a second location on the torsion shaft, the first location being distal from the second location, the at least one first tooth being proximate the at least one second tooth whereby the teeth interleave, the angular distance between the at least one first tooth and the at least second tooth varying as the torque in the torsion shaft changes, a single sensor being positioned proximate the interlocked teeth.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
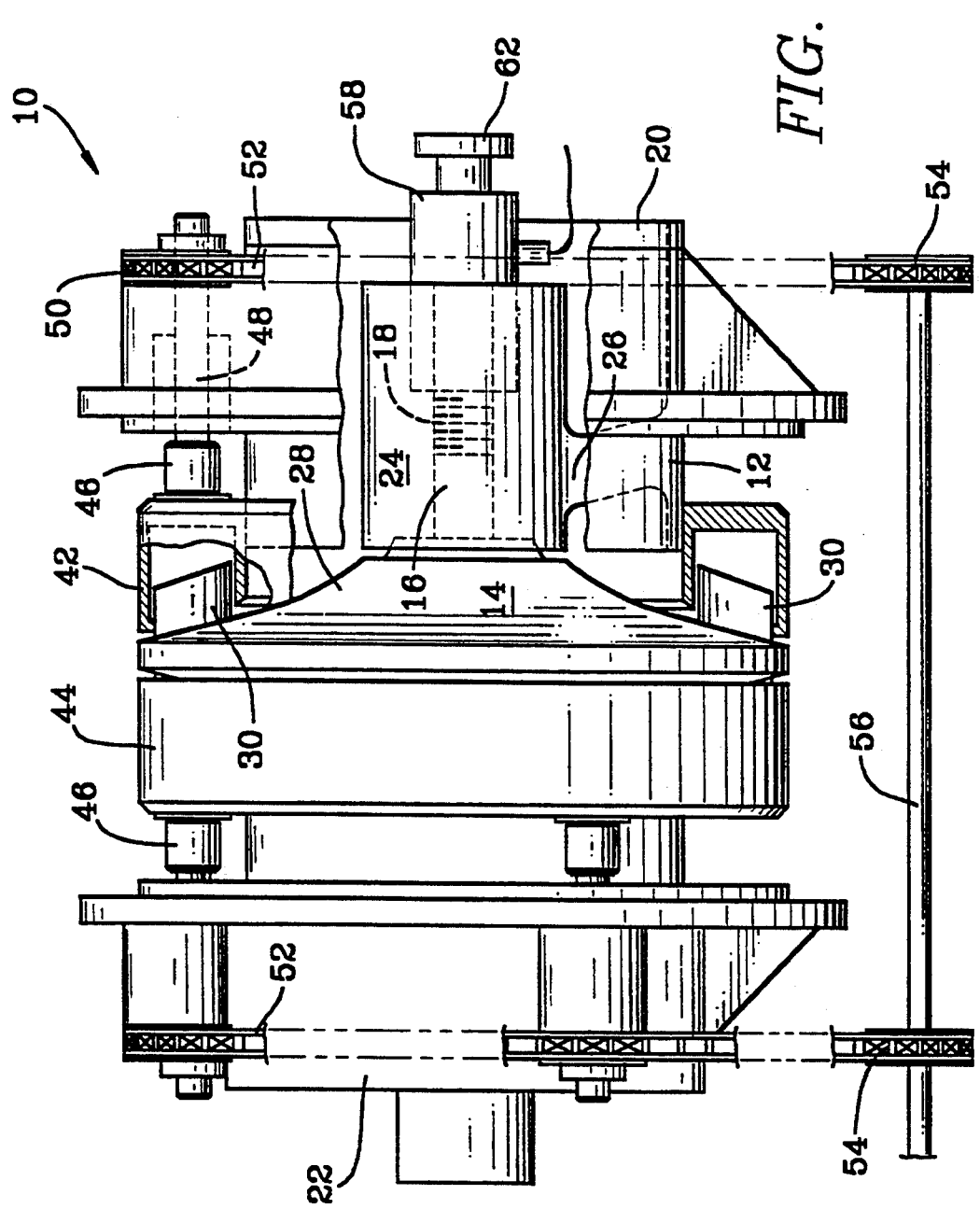
FIG. 1 is a side elevation view partly cross-sectioned, showing an absorption dynamometer and torque measurement system.
Figures 4, 4A:
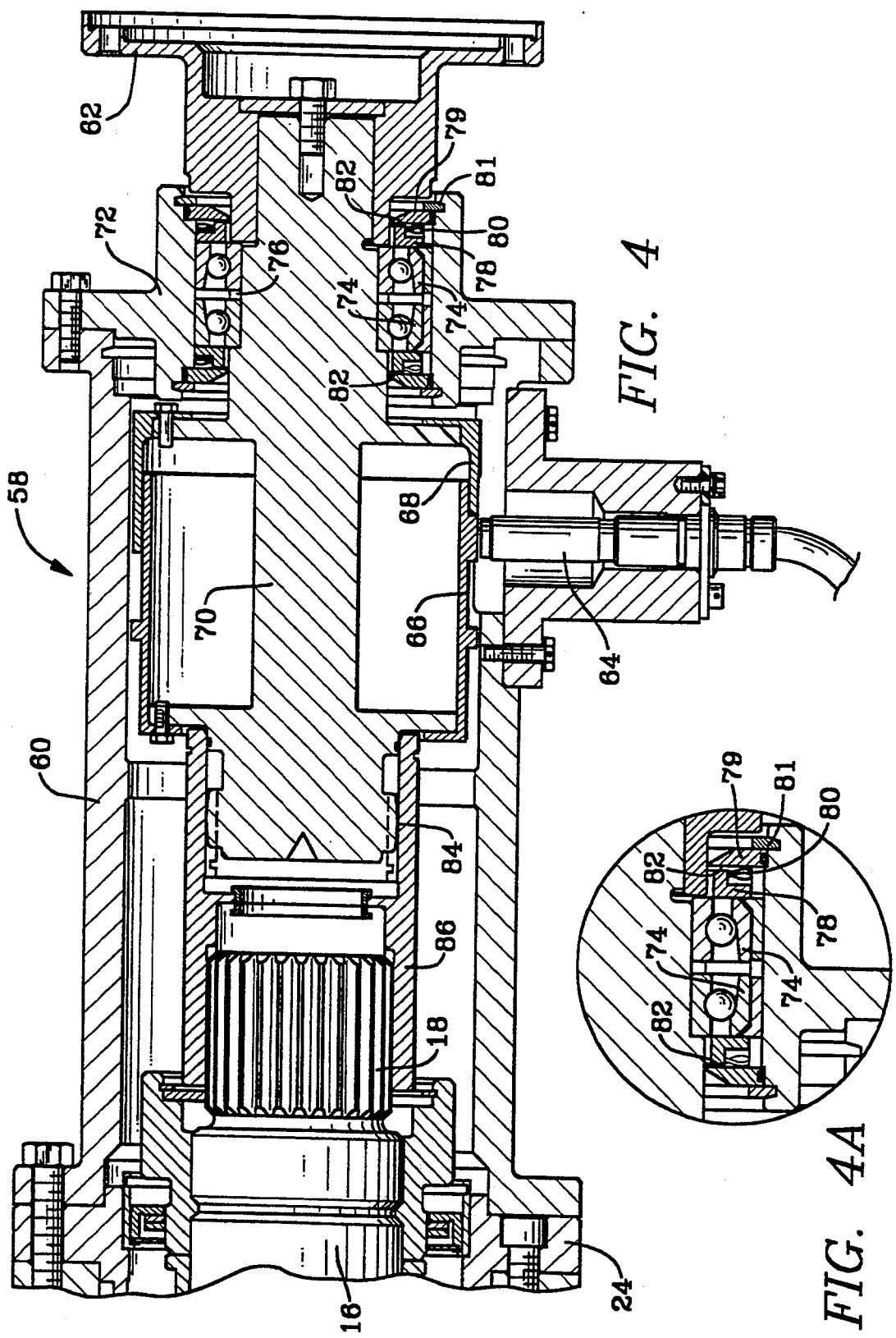
FIG. 4 is a side elevation in cross-section showing the details of an in-line torque measurement system.
FIG. 4A is an enlarged view of the bearings shown in FIG. 4.

The invention described below is an in-line torque meter for use with an air absorption dynamometer in which the twist of a rotating shaft that transmits torque from an engine to the dynamometer is measured by a single sensor on the adjacent stationary structure. A typical embodiment is shown in FIGS. 1 and 4. The torque shaft is supported at the dynamometer end by a splined attachment to the shaft of the dynamometer and at the engine end in a pair of preloaded angular contact ball bearings. Torque from the engine causes the shaft to twist. Attached to and rotating with the shaft are two sleeves with projecting teeth, one sleeve attached at each end of the torque shaft. The projecting teeth are interleaved and are located so that both sets of teeth can be viewed by an adjacent sensor. When the shaft is twisted by the applied torque, the teeth on the two sleeves are angularly displaced with respect to each other. This angular displacement is measured as a phase shift in the signal generated by the sensor. The phase shift being directly proportional to the applied torque.

This torque meter is built into the dynamometer structure. The torque meter is not disturbed when the engine is removed and replaced. It is therefore protected from damage in the process of engine attachment and removal.

The torque meter also uses a single sensor for measurement of phase displacement. This removes the dual sensor errors present in prior art torque meters, thereby improving the accuracy of torque measurement.

Figure 2:
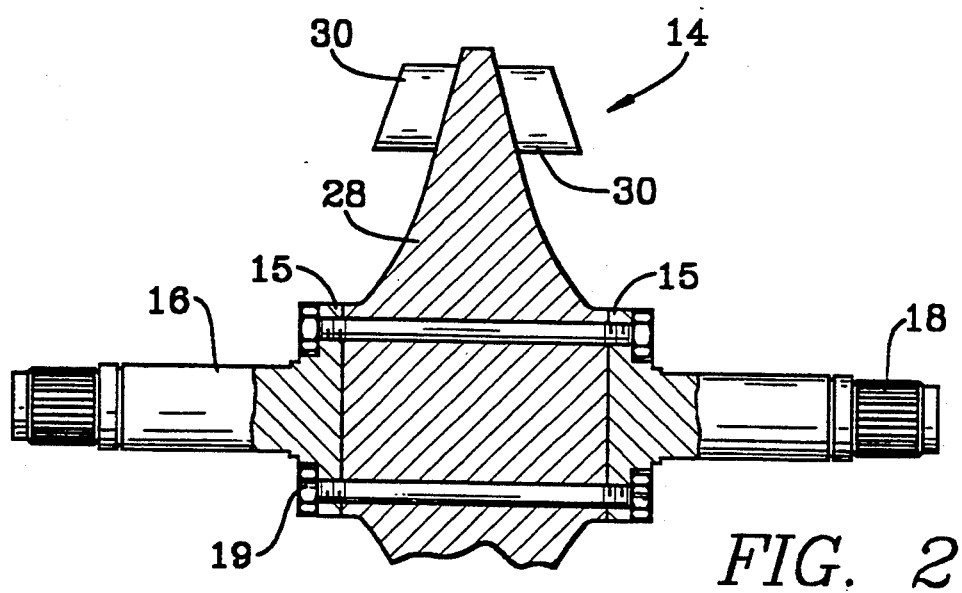
FIG. 2 is a partially cross-sectioned view of the major portion of the rotor shown in FIG. 1.
Figure 3:
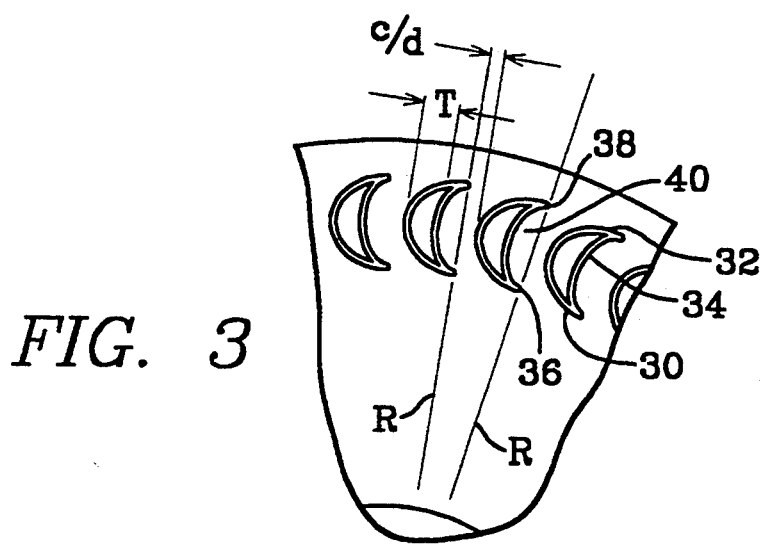
FIG. 3 is a fragmentary end view, taken from the left side of FIG. 2, of a portion of the rotor body showing some of the blades about the periphery thereof.

Although the torque meter system can be used with other absorption dynamometers, the preferred absorption dynamometer 10 is shown in FIGS. 1 through 3. The absorption dynamometer 10 comprises a structure 12 in which a bladed rotor 14 is bolted to a pair of stub shafts 16. One end of each stub shaft 16 has a flange 15. The rotor is attached to the shaft 16 by a plurality of bolts 19 passing through the flanges 15 and the rotor 14.

One end of one shaft 16 has a coupling 18 for attachment to the torque measurement system 58.

The structure 12 is open at opposite axial ends 20 and 22 to provide for admittance of fluid from both ends. Centrally of the structure 12, within each end, are shaft support housings 24 (only one is shown) which are integral with three, equidistant struts 26 (only one is shown). The struts 26 bridge, radially, between the housings 24 and the inside, circumferential surface of the ends 20, 22 of the structure 12. The rotor 14 has a body 28, and about the periphery of each side thereof is a series of arcuate blades 30, the blades being interposed in the radial exit flow paths for the fluid admitted from the ends 20, 22.

Blades 30 are defined of convex and concave surfaces 32 and 34 which terminate at, and join, in lateral edges 36 and 38. Each blade 30 has a greatest thickness "T" common to all blades 30. The edges 36, 38 of any blade 30 occur on a radial line "R" drawn from the axial center of the rotor 14. The circumferential distance "c/d" obtaining between a given radial line "R", and a blade 30 most adjacent thereto, is less than said thickness "T". Between blades 30, there exists an arcuate channel 40 for fluid having a width which is greater than said thickness "T".

The structure 12 carries a pair of annular shrouds 42 and 44 which are selectively engageable with and disengageable from the blades 30 for occluding and exposing more or less of the blade lengths to the radial exit flow paths for the fluid. Each annular shroud 42 and 44 is coupled to a ball nut 46 which is engaged with a ball screw 48. The latter terminates in a sprocket 50 which is engaged with and driven by a roller chain 52. There are three, circumferentially spaced apart ball nut, screw and sprocket arrangements on each side of the dynamometer 10, and each side has a separate drive chain 52. However, the threading of the ball screw 48 on one side of the dynamometer 10 is of the opposite hand of the other. Hence, upon the roller drive chains 52 being turned in a common direction, the shrouds 42, 44 on either sides will advance upon the rotor blades 30 in common, or withdraw therefrom in common. In order to drive the roller chains 52 in common, the latter are coupled to drive sprockets 54 mounted on a shroud control shaft 56. The latter is driven, selectively, by means not shown. The shrouds 42, 44 do not contact the blades 30.

Axial blades 30 are arranged on either side of the body 28 of the rotor 14 oriented in a radial aerodynamic flow path. As shown, the rotor 14 is rotatably supported between the housings 24 and the arcuate sides of the rotor turn the admitted axially flowing fluid to radial flows. The blades 30, then, are interposed in the radially-exiting fluid flow paths. This configuration of rotor blading 30 permits the variation of the effective length of the blades 30 in the dynamometer 10 and, thus, the power absorbed may be varied, with the speed held constant.

The torque measurement system 58 is shown attached to coupling 18 on one end of shaft 16. A torque sensor housing 60 is attached to one of the shaft support housings 24 and extends axially away from the shaft support housing 24. A connecting flange 62 is attached to torque shaft 70. The engine to be tested is attached to the connecting flange 62. The torque measurement system 58 is designed to be compact, such that the majority of the torque measurement system 58 remains within the original envelop of the absorption dynamometer 10.

As shown in FIG. 4, the torque measurement system 58 is enclosed in the torque sensor housing 60. Attached to the free end of the housing 60 is a bearing housing 72. A pair of angular contact bearings 74 are mounted in the bearing housing 72. The bearings 74 are separated by a spacer 76 positioned between the bearings 74. A wave spring 80 and an "L" shaped spring support 78 are located adjacent each angular contact bearing 74. The wave springs 80 preload the angular contact bearings 74. A spacer 79 and snap ring 81 are axially positioned adjacent the wave spring 80 and spring support 78. The spacers 79 and snap rings 81 transmit the spring force of the wave springs 80 to the bearing housing 72. A small clearance 82 is provided to accommodate axial movement of the torque shaft 70. The clearance 82 is between the spring support 78 and the spacer 79. Each clearance 82 is approximately 0.02 inches. Axial movement of the torque shaft 70 is limited by the spacers 79 and snap rings 81.

The torque shaft 70 is supported on the outboard end by the angular contact bearings 74. The inboard end of the torque shaft 70 is connected by a coupling 86 to splined coupling 18 provided on the end of shaft 16. The inboard end 84 of the torque shaft 70 is permitted to slide axially relative to the coupling 86. The torque shaft 70 and the coupling 86 are also splined. In the event the engine connected to the dynamometer 10 and torque measurement system 58 moves axially relative to the dynamometer 10, the clearances 82 permit the torque shaft 70 to move axial relative to the coupling 86 and the dynamometer 10, thus axial movement of the engine is taken up by the torque measurement system 58 and is not transmitted to the dynamometer 10.

Figure 5:
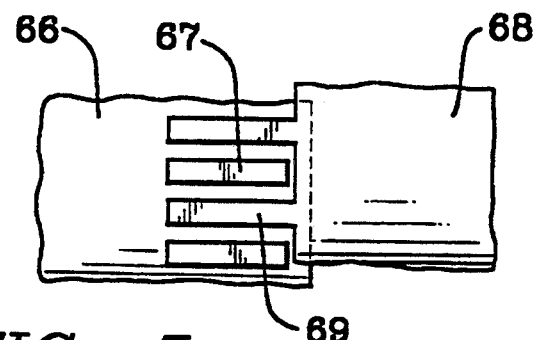
FIG. 5 is a partial plan view showing the intermeshing teeth of the torque measurement system of FIG. 4.

Two toothed cylindrical sleeves 66, 68 are attached to the torque shaft 70. The sleeves 66, 68 are attached to opposite ends of the torque shaft 70. Interleaving teeth 67, 69 extend from each sleeve 66, 68. One sleeve 66 has a smaller diameter than the other sleeve 68. As shown in FIGS. 4 and 5, the teeth 67 extend radially from sleeve 66. Teeth 69 extend axially from sleeve 68. The teeth 67, 69 interleave as shown in FIG. 5. A single sensor 64 is positioned proximate the interleaving teeth 67, 69. The preferred sensor 64 is a variable reluctance sensor. This sensor 64 detects the phase shift between the teeth 67, 69. The phase shift is proportional to the torque transmitted by torque shaft 70.

The present invention incorporates the following advantages:

The torque meter develops the required twist in a very short shaft. There is minimal increase in the envelope of the dynamometer.

The torque meter absorbs axial movement of the engine shaft, isolating the dynamometer from such movement.

The critical speed of the torque meter is above the operating range of the dynamometer.

The torque meter is supported by high-performance grease-packed bearings, completely independent of the bearings and lubrication system of the dynamometer itself.

Having described the invention, what is claimed is:

1. An absorption dynamometer having
   an in-line torque meter the in-line torque sensor having a rotating torsion shaft, one end of the shaft being coupled to the dynamometer, a support means for rotatably supporting the shaft being coupled to the other end of the shaft, the support means being mounted in a housing, the housing axially extending from the dynamometer, at least one first tooth projecting from a first location on the torsion shaft, at least one second tooth projecting from a second location on the torsion shaft, the first location being distal from the second location, the at least one first tooth being proximate the at least one second tooth whereby the teeth interleave, the angular distance between the at least one first tooth and the at least second tooth varying as the torque in the torsion shaft changes, a single sensor being positioned proximate the interleaving teeth.

2. The absorption dynamometer of claim 1, wherein the support means comprises a pair of angular contact bearings.

3. The absorption dynamometer of claim 1, wherein the at least one first tooth extends axially and the at least one second tooth extends radially.

4. The absorption dynamometer of claim 1, wherein the sensor is a variable reluctance sensor.

5. The absorption dynamometer of claim 1, further comprising:
accommodation means for allowing axial movement of the torsion shaft, the accommodation means limiting axial movement of the torsion shaft.

6. The absorption dynamometer of claim 5, wherein the accommodation means comprises:
a bearing support mounted within the housing;
a pair of angular contact bearings slidably mounted within the bearing support;
a preload means for axially biasing each angular contact bearing, a predetermined axial gap being provided between the preload means and the bearing support.

7. The absorption dynamometer of claim 6, wherein the preload means is a wave spring.

8. The absorption dynamometer of claim 6, wherein the torsion shaft is coupled to the dynamometer by a coupling, the torsion shaft being axially slidable relative to the coupling.

9. An absorption dynamometer having
an in-line torque meter the in-line torque sensor having a rotating torsion shaft, one end of the shaft being coupled to the dynamometer, a support means for rotatably supporting the shaft being coupled to the other end of the shaft, the support means being mounted in a housing, the housing axially extending from the dynamometer, two cylindrical sleeves attached to the torsion shaft, the first sleeve being attached to the torsion shaft at a first location, the second sleeve being attached to the torsion shaft at a second location, the first location being distal to the second location, the first sleeve having a plurality of axially extending teeth, the second sleeve having a plurality of radially extending teeth, the sleeves being positioned such that the teeth interleave, the angular distance between a first sleeve tooth and an adjacent second sleeve tooth varying as the torque in the torsion shaft changes, a single sensor being positioned proximate the interleaving teeth and accommodation means for allowing axial movement of the torsion shaft, the accommodation means limiting axial movement of the torsion shaft, the accommodation means comprising a bearing support mounted within the hosing, a pair of angular contact bearing slidably mounted within the bearing support and a preload means for axially biasing each angular contact bearing, a predetermined axial gap being provided between the preload means and the bearing support.

10. An absorption dynamometer comprising:
a first housing;
a rotor shaft rotatably mounted within the first housing;
a rotor mounted on the rotor shaft, the rotor having a body and a plurality of blades projecting from the body substantially parallel to the axis of rotation of the toro, the plurality of blades being substantially radially disposed on the rotor, each blade having a radially innermost edge and a radially outermost edge, said edges of each blade lying substantially on a given, discrete radial line drawn from the rotor axis, each blade being spaced apart from the blades immediately adjacent thereto, a given circumferential distance, thereby defining on opposite sides of each blade, radial flow paths;
means for admitting fluid into the hosing for communication thereof with the rotor from either of opposite axial directions;
control means for occluding said blades, the control means being coupled to said housing; and
an in-line torque meter having a rotating torsion shaft, one end of the torsion shaft being coupled to the rotor shaft, a support means for rotatably supporting the torsion shaft beings coupled to the other end of the torsion shaft, the support means being mounted in a second housing, the second housing axially extending from the first housing, two cylindrical sleeves attached to the torsion shaft, the first sleeve being attached to the torsion shaft at a first location, the second sleeve being attached to the torsion shaft at a second location, the first location being distal to the second location, the first sleeve having a plurality of axially extending teeth, the second sleeve having a plurality of radially extending teeth, the sleeves being positioned such that the teeth interleave, the angular distance between a first sleeve tooth and an adjacent second sleeve tooth varying as the torque in the torsion shaft changes, a single sensor being positioned proximate the interleaving teeth.

11. The absorption dynamometer according to claim 10, wherein the support means comprises a pair of angular contact bearings.

12. The absorption dynamometer according to claim 10, wherein the teeth on one sleeve extend axially, the teeth on the other sleeve extend radially, one sleeve has a diameter greater than the diameter of the other sleeve.

13. The absorption dynamometer according to claim 10, further comprising:
accommodation means for allowing axial movement of the torsion shaft, the accommodation means limiting axial movement of the torsion shaft.

14. The absorption dynamometer according to claim 13, wherein the accommodation means comprises:
a bearing support mounted within the second housing;
a pair of angular contact bearings slidably mounted within the bearing support;
a preload means for axially biasing each angular contact bearing, a predetermined axial gap being provided between the preload means and the bearing support.

15. The absorption dynamometer according to claim 10, further comprising:

accommodation means for allowing axial movement of the torsion shaft, the accommodation means limiting axial movement of the torsion shaft, the accommodation means comprising a bearing support mounted within the second housing; a pair of angular contact bearings slidably mounted within the bearing support; and a preload means for axially biasing each angular contact bearing, a predetermined axial gap being provided between the preload means and the bearing support.

16. An absorption dynamometer, for fluid, comprising:

a first housing;

a rotor shaft rotatably journaled in said first housing;

a rotor mounted on the rotor shaft, said rotor having a rotary axis, said rotor having a body and a plurality of blades projecting from the body substantially parallel with said axis, said blades of said plurality being substantially radially disposed on said rotor, each blade having a radially innermost edge and a radially outermost edge, and said edges of each blade lying substantially on a given, discrete radial line drawn from said axis, each of said blades being spaced apart from blades immediately adjacent thereto, a given circumferential distance, thereby to define, on opposite sides of each said blade, open, unobstructed, radial flow paths for fluid;

means for admitting fluid into said communication thereof with said rotor from either of opposite axial directions;

means, coupled to said structure, selectively operative for occluding said blades, of said plurality thereof, from fluid admitted into said structure; and an in-line torque meter having a rotating torsion shaft, one end of the torsion shaft being coupled to the rotor shaft, a support means for rotatably supporting the torsion shaft being coupled to the other end of said torsion shaft, the support means being mounted in a second housing, said second housing axially extending from said first housing, two cylindrical sleeves attached to said torsion shaft, the first sleeve being attached to the torsion shaft at a first location, the second sleeve being attached to the torsion shaft at a second location, the first location being distal to the second location, the first sleeve having a plurality of axially extending teeth, the second sleeve having a plurality of radially extending teeth, the sleeves being positioned such that the teeth interleave, said sleeves being positioned such that said teeth interleave, the angular distance between a first sleeve tooth and an adjacent second sleeve tooth varying as the torque in the torsion shaft changes, a single sensor being positioned proximate said interleaving teeth.

17. The absorption dynamometer, for fluid, according to claim 16, wherein said support means comprises a pair of angular contact bearings.

18. The absorption dynamometer, for fluid, according to claim 17, further comprising:

accommodation means for allowing axial movement of said torsion shaft, the accommodation means limiting axial movement of said torsion shaft.

19. The absorption dynamometer, for fluid, according to claim 17, further comprising:

accommodation means for allowing axial movement of said torsion shaft, said accommodation means limiting axial movement of said torsion shaft, said accommodation means comprising a bearing support mounted within said second housing; a pair of angular contact bearings slidably mounted within said bearing support; and a preload means for axially biasing each angular contact bearing, a predetermined axial gap being provided between said preload means and said bearing support.

20. The absorption dynamometer, for fluid, according to claim 19, wherein said rotor body has an accurately-formed surface, on at least one of opposite sides thereof, which defines a fluid-confronting surface; and said blades of said plurality thereof project from said surface substantially normal thereto.

21. The absorption dynamometer, for fluid, according to claim 20, wherein said blades are of arcuate cross-section, having opposite, concave and convex surfaces.

22. The absorption dynamometer, for fluid, according to claim 19, wherein said occluding means comprises:

means for shrouding said blades; and means for moving said shrouding means in both of said axial directions.

23. The absorption dynamometer, for fluid, according to claim 19, wherein said occluding means comprises:

means for shrouding said blades on both said opposite sides of said rotor; and means for moving said shrouding means in both of said axial directions simultaneously.

* * * * *

UNITED STATES PATENT AND TRADEMARK OFFICE
CERTIFICATE OF CORRECTION

PATENT NO. : 5,345,827
DATED : September 13, 1994
INVENTOR(S) : Walter L. Brassert and Paul N. Dahlstrand It is certified that error appears in the above-indentified patent and that said Letters Patent is hereby corrected as shown below:

Column 4, line 30, delete "axial" and replace with --axially--.

Column 6, line 20, claim 10, delete "hosing" and replace with --housing--.

Column 6, line 28, claim 10, delete "beings" and replace with --being--.

Signed and Sealed this

Sixth Day of December, 1994

Attest:

BRUCE LEHMAN

Attesting Officer

Commissioner of Patents and Trademarks